(12) United States Patent
Pollack et al.

(10) Patent No.: US 6,351,593 B1
(45) Date of Patent: Feb. 26, 2002

(54) HERMETICALLY SEALED CONNECTORS AND FEED-THROUGHS FOR FIBER OPTIC CABLES AND METHOD FOR EFFECTING HERMETIC SEALS FOR SUCH CABLES

(75) Inventors: Michael J. Pollack, Lansdale; Robert Hamilton, Philadelphia, both of PA (US)

(73) Assignee: Three E Laboratories, Inc., Montgomeryville, PA (US)

( * ) Notice: Subject to any disclaimer, the term of this patent is extended or adjusted under 35 U.S.C. 154(b) by 0 days.

(21) Appl. No.: 09/448,163

(22) Filed: Nov. 24, 1999

Related U.S. Application Data

(60) Provisional application No. 60/110,246, filed on Nov. 30, 1998.

(51) Int. Cl.[7] .................................................. G02B 6/00
(52) U.S. Cl. .......................... 385/138; 385/59; 385/62; 385/72; 385/78
(58) Field of Search .............................. 385/56, 58, 59, 385/60, 62, 69, 70–72, 76, 78, 138

(56) References Cited

U.S. PATENT DOCUMENTS

| 4,252,457 | A | | 2/1981 | Benson et al. | |
|---|---|---|---|---|---|
| 4,406,515 | A | | 9/1983 | Roberts | |
| 4,669,818 | A | | 6/1987 | Myer | |
| 4,753,510 | A | | 6/1988 | Sezerman | |
| 4,756,595 | A | | 7/1988 | Braun et al. | |
| 4,759,601 | A | | 7/1988 | Knutsen et al. | |
| 4,826,276 | A | | 5/1989 | Abbott et al. | |
| 4,834,479 | A | | 5/1989 | Adl | |
| 4,891,640 | A | | 1/1990 | Ip | |
| 5,114,191 | A | | 5/1992 | Sareshwala | |
| 5,155,795 | A | * | 10/1992 | Wasserman et al. | 385/138 |
| 5,177,806 | A | | 1/1993 | Abbott et al. | |
| 5,210,815 | A | * | 5/1993 | Alexander et al. | 385/138 |
| 5,253,321 | A | | 10/1993 | Long et al. | |
| 5,435,405 | A | | 7/1995 | Schempf et al. | |
| 5,588,086 | A | * | 12/1996 | Fan | 385/138 |
| 5,613,031 | A | | 3/1997 | Tanabe et al. | |
| 5,664,043 | A | | 9/1997 | Donaldson et al. | |
| 5,689,608 | A | | 11/1997 | Moore et al. | |
| 5,732,180 | A | | 3/1998 | Kaplan | |
| 5,783,152 | A | | 7/1998 | Nave | |
| 5,815,619 | A | * | 9/1998 | Bloom | 385/78 |

* cited by examiner

*Primary Examiner*—Akm E. Ullah
*Assistant Examiner*—Jennifer Doan
(74) *Attorney, Agent, or Firm*—Ratner & Prestia

(57) ABSTRACT

A hermetically sealed fiber optic connector or feed through, the connector for connecting at least two fiber optic cables and including a center member having two extensions, with each of the extensions being cylindrical and coaxial. Each of the extensions includes a first engagement means and a first sealing means, with the center member defining a channel axially disposed relative to the extensions. A first connector includes a backshell, with the backshell including a second engagement means in complementary relationship with the first engagement means of a first one of the extensions, and a second sealing means in complimentary relationship with the first sealing means of the first one of the extensions. The first connector includes a ferrule seat and a ferrule joined to the ferrule seat, and includes a cylindrical crimp socket joined to the ferrule seat. The crimp socket defines an axial channel for receiving a first fiber optic cable. The ferrule seat defines a bore placing the ferrule in communication with the axial channel. The bore receives the optical fiber of the first fiber optic cable and places the ferrule in optical communication with the first optical fiber. The feed through of the present invention seals onto a fiber optic cable.

4 Claims, 7 Drawing Sheets

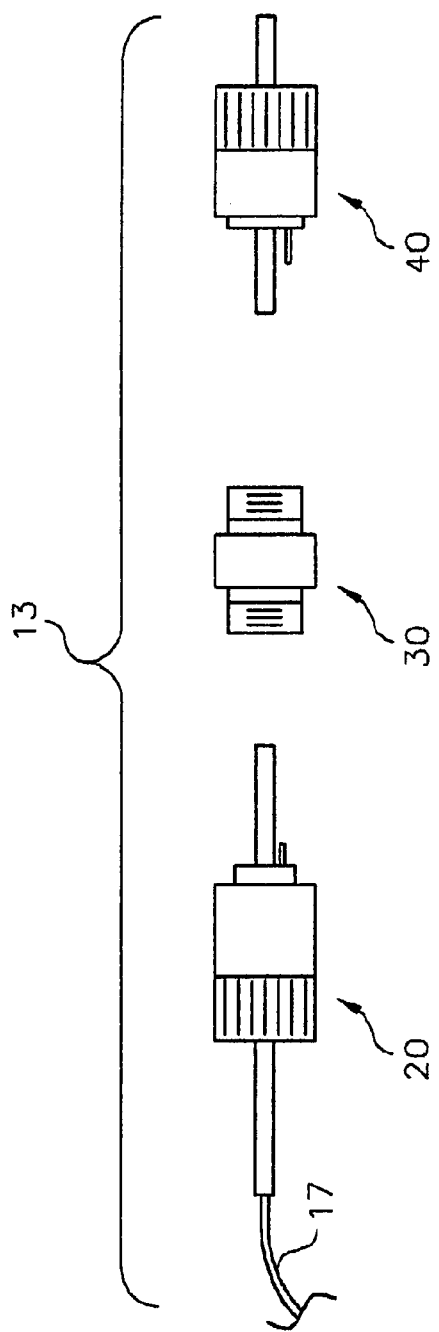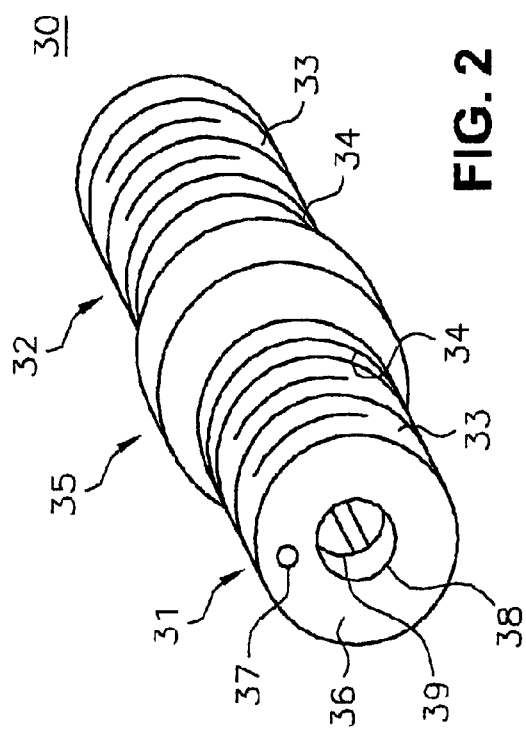

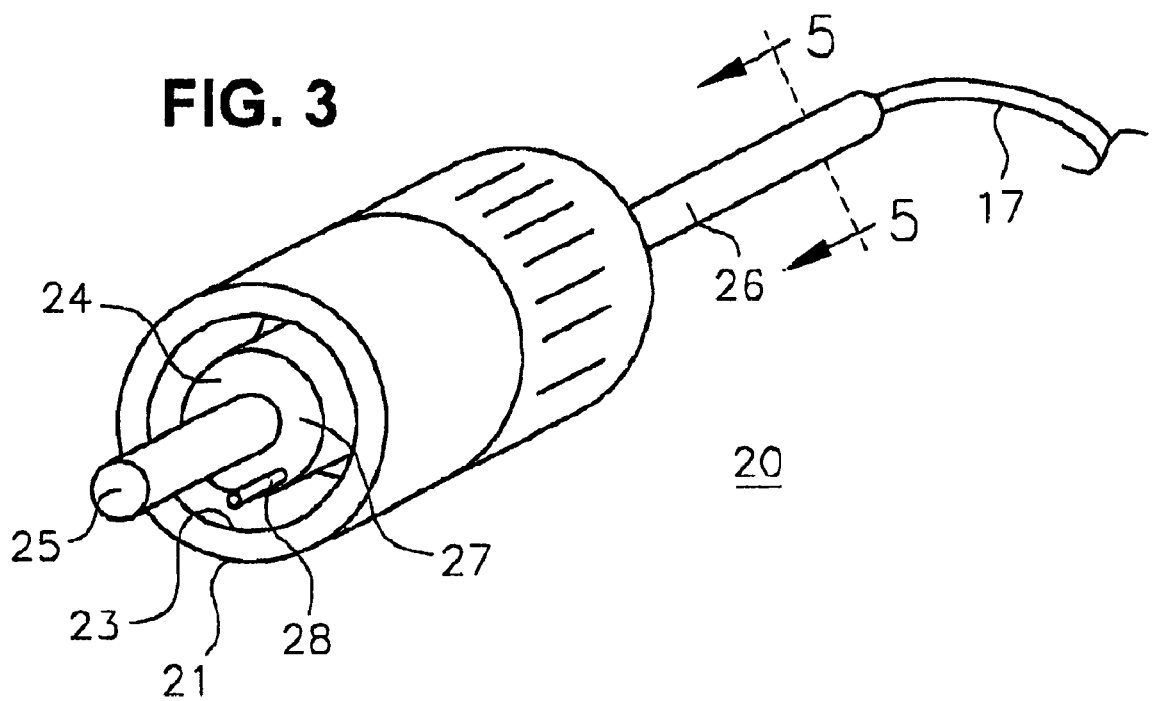
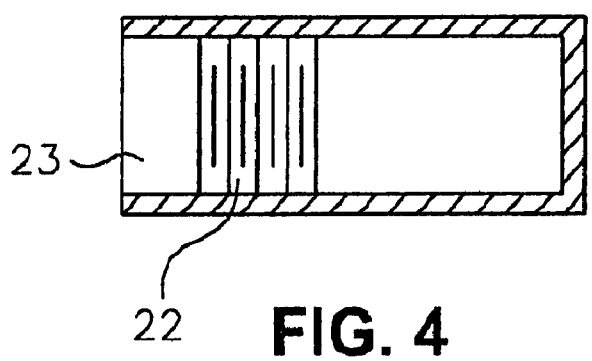

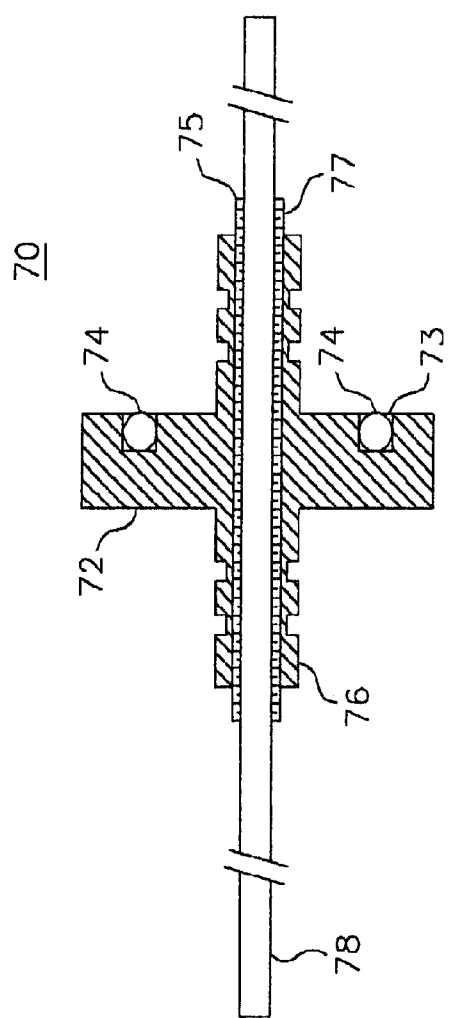
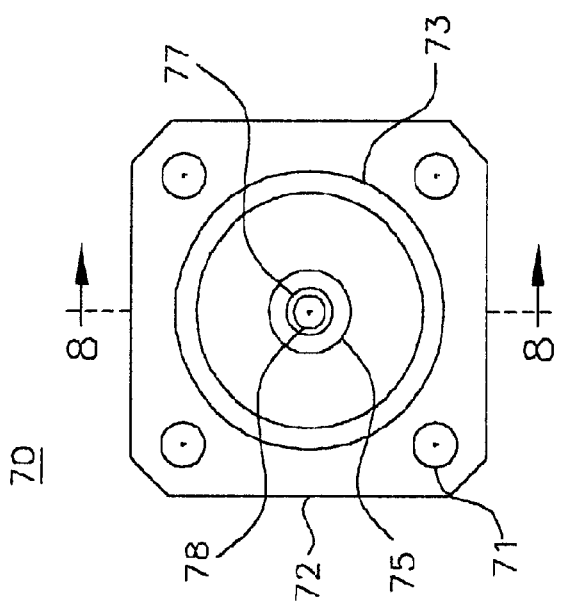

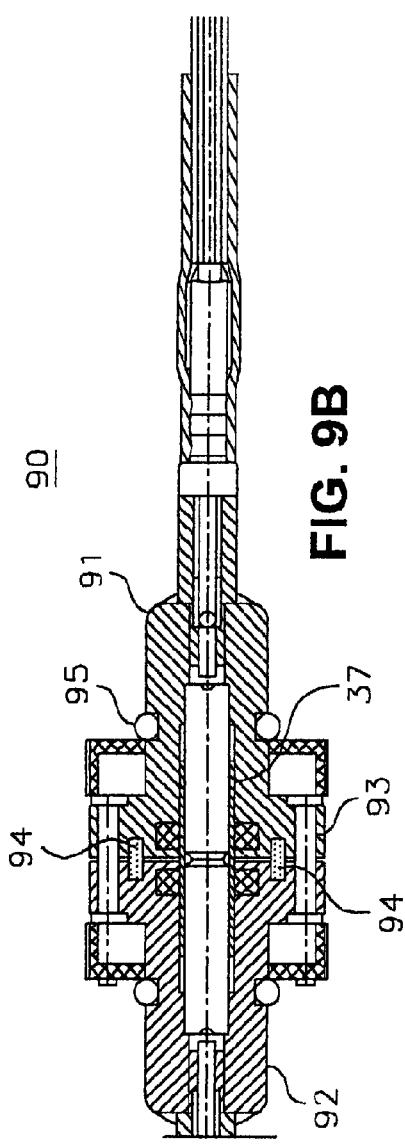
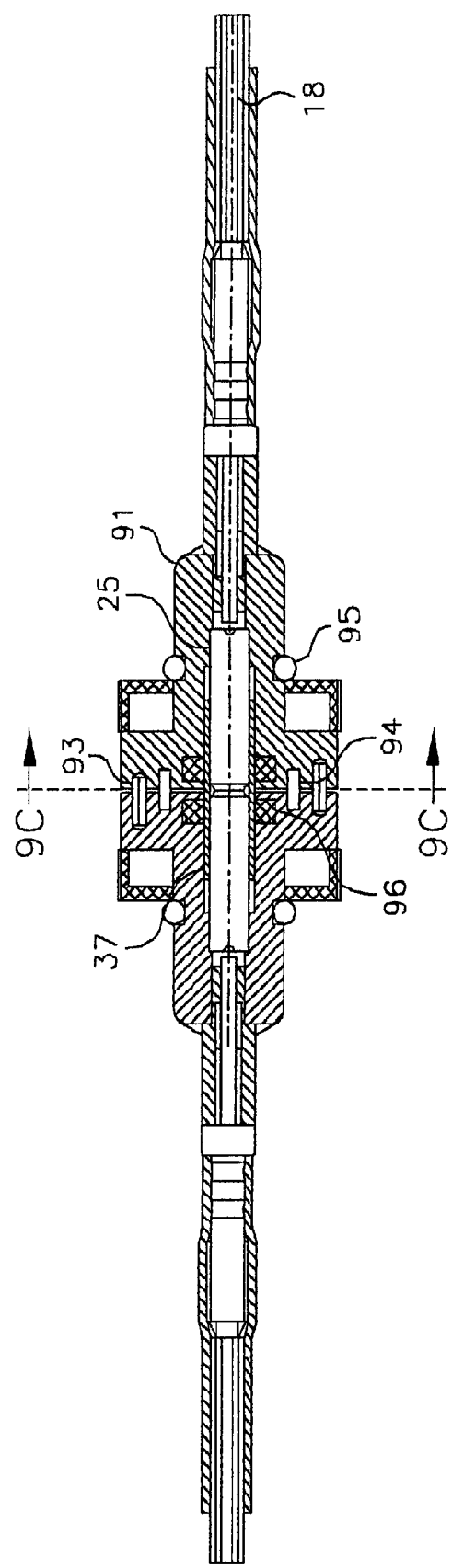
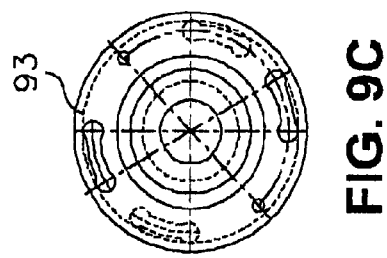

HERMETICALLY SEALED CONNECTORS AND FEED-THROUGHS FOR FIBER OPTIC CABLES AND METHOD FOR EFFECTING HERMETIC SEALS FOR SUCH CABLES

This appln claims benefit of Prov. No. 60/110,246 filed Nov. 30, 1998.

FIELD OF THE INVENTION

The present invention relates generally to connectors and feed throughs for use with fiber optic cables and more specifically to fiber optic connectors and feed throughs for applications that would benefit from a connector or feed through having a hermetic seal.

BACKGROUND OF THE INVENTION

Fiber optic communications systems are increasingly being used to supplant traditional wire-conductor communications systems. With the advent of optical fiber cable systems comes the attendant fittings, connectors, and feed-throughs that are associated with such systems. Optical fiber cable, in particular the fiber itself, is particularly vulnerable to stress and to environmental contamination. For example, optical fiber must be handled and installed carefully to avoid damaging the fiber. Installation procedures typically call for not bending the cable beyond a given radius of curvature to avoid stressing the fiber. Any fractures, microbends, or other structural damage to the fiber can degrade the transmissivity of the fiber, leading to signal loss or outright fiber failure. Further, where the cable is terminated for any reason, for example to join to another cable, the fiber within the cable may be exposed to environmental contaminants, with resulting damage to the transmissivity and integrity of the fiber.

Because of the particular sensitivity of fiber optic cables, conventional connectors and fittings are typically labor-intensive, time-consuming, and difficult to install in the field. However, with the increasing use of optical fiber communication systems, there will be a corresponding need to install, maintain, and upgrade such systems. The complexity of conventional connectors and their associated installation procedures can increase the labor costs of maintaining fiber systems. Accordingly, there exists a need in the art for effective, efficient, and easily installed optical fiber connectors and feed-throughs.

SUMMARY OF THE INVENTION

The connector of the present invention connects at least two fiber optic cables and includes a center member having two extensions, with each of the extensions being cylindrical and coaxial. Each of the extensions includes a first engagement means and a first sealing means, with the center member defining a channel axially disposed relative to the extensions.

A first connector includes a backshell, with the backshell including a second engagement means in complementary relationship with the first engagement means of a first one of the extensions, and a second sealing means in complimentary relationship with the first sealing means of the first one of the extensions. The first connector includes a ferrule seat and a ferrule joined to the ferrule seat, and includes a cylindrical crimp socket joined to the ferrule seat. The crimp socket defines an axial channel for receiving a first fiber optic cable. The ferrule seat defines a bore placing the ferrule in communication with the axial channel. The bore receives the optical fiber of the first fiber optic cable and places the ferrule in optical communication with the first optical fiber.

The feed through of the present invention seals onto a fiber optic cable and is comprised of a feed-through tube having two cylindrical and coaxial extensions that defines a channel coaxially with the extensions for receiving the fiber optic cable. A sleeve is positioned within the channel and around the fiber optic cable. An annular flange is disposed perpendicularly to the extensions, with the flange defining an annular groove. An O-ring is disposed in the annular groove. A first strain relief boot engages the fiber optic cable and engages a first one of the extensions. A second strain relief boot engages the fiber optic cable and engages a second one of the extensions.

BRIEF DESCRIPTIONS OF THE DRAWINGS

The present invention will not be described by way of non-limiting example, with reference to the attached drawings in which:

FIG. 1 is a plan view of a connector in disassembled form, constructed in accordance with an exemplary embodiment of the present invention;

FIG. 2 is a perspective view of the center member of the connector as shown in FIG. 1;

FIG. 3 is a perspective view of a cable terminator as shown in FIG. 1;

FIG. 4 is a sectional view of a backshell shown as part of the cable terminator as shown in FIG. 3;

FIG. 7 is a top plan view of an exemplary embodiment of a feed-through constructed in accordance with the present invention;

FIG. 8 is a cut-away diagram of the exemplary embodiment of the feed-through of the invention, taken along the line 3—3 in FIG. 2;

FIG. 9 is a cut-away diagram of a connector constructed in accordance with an alternative embodiment of the invention;

DETAILED DESCRIPTION

Figure 5A:
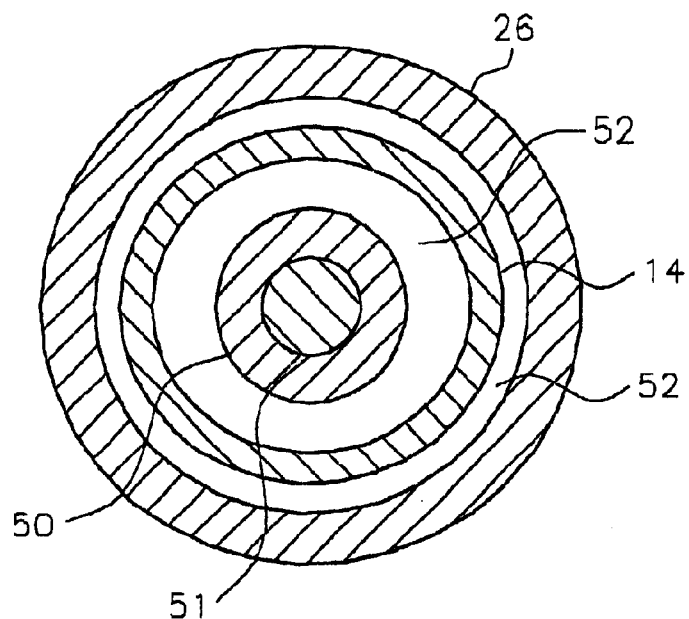
FIGS. 5a and 5b are cross-sectional views of the connector stem of the cable terminator, taken along the line 5—5 in FIG. 3.

FIG. 1 is a plan view of a connector in disassembled form, constructed in accordance with an exemplary embodiment of the present invention. A hermetically sealed connector 10 joins two fiber optic cables 17 and 18, with each of the cables 17 and 18 containing an optical fiber. The connector 10 comprises a center member 30, a first cable terminator 20, and a second cable terminator 40.

Referring to FIG. 2, the center member 30 includes two extensions 31 and 32. In the exemplary embodiment, each extension 31 and 32 is cylindrical and the two extensions 31 and 32 are coaxial. Each of the extensions 31 and 32 include an engagement means 33 and a sealing means 34. An exemplary engagement means 33 is the male threaded portion disposed around the outer surface of each of the extensions 31 and 32. The engagement means 33 cooperates with a complementary engagement means provided by the first and second cable terminators 20 and 40 to secure the cable terminators 20 and 40 to the center member 30.

An exemplary sealing means 34 is the O-ring 34 located as shown proximate the engagement means 32. The O-ring is disposed in an annular groove scored into each extension 31 and 32. The sealing means 34 provides a barrier between the center member 30 and each of the cable terminators 20 and 40 to prevent environmental contaminants from entering the connector 10 to damage the sensitive optical fibers contained within the first and second optical fiber cables 17 and 18.

The center member 30 also includes a raised, annular shoulder 35. When the cable terminators 20 and 40 are fully engaged with the center member 30, the cable terminators 20 and 40 bear against the shoulder 35 to provide a snug mechanical coupling with the center member 30. This snug mechanical coupling maintains an optimum positional relationship between the optical fiber cables 17 and 18.

The center member 30 includes an abutment face 36 at the end of each extension 31 and 32. Each abutment face 36 includes an alignment means 37. An exemplary alignment means 37 is an aperture 37 that receives a corresponding alignment pin 28 (see FIG. 3) provided in each cable terminator 20 and 40, as described below. It should be understood that this relationship between the aperture 37 and the alignment pin 28 could readily be reversed within the scope of the invention. The center member 30 could provide the alignment pin 28 and the cable terminators 20 and 40 could define the aperture 37. The alignment means 37 ensures that the two fiber optic cables 17 and 18 are maintained in a proper radial relationship after the connector 10 is installed onto the cables 17 and 18 and fully assembled. For example, if one cable 17 is twisted or rotated relative to the other cable 18, the transmission of the light through the connector 10 may be degraded due to back reflections, losses, etc. with a corresponding loss of signal quality.

The center member 30 defines a channel 38 axially disposed relative to the extensions 31 and 32. The channel 38 passes entirely along the length of the center member 30, and receives a pair of ferrules 25 provided by each of the cable terminators 20 and 40, and allows light to pass between the ferrules 25 when the connector 10 is fully assembled. Means 39 for aligning the ferrules can be provided within the channel 38. An exemplary alignment means 39 is a split-sleeve 39 as shown in FIG. 2.

Referring to FIG. 3, the first cable terminator 20 includes a backshell 21 that engages one of the extensions 31 or 32 of the center member 30. The backshell 21 includes a second engagement means 22 in cooperating and complementary relationship with the first engagement means 33 provided by the extensions 31 and 32. The backshell 21 also includes a second sealing means 23 in cooperating and complementary relationship with the sealing means 34 provided by the extensions 31 and 32. An exemplary second engagement means 22 is the female threaded portion 22 (FIG. 4) inside the backshell 21 that threads onto the male threaded portion on the extensions 31 or 32. An exemplary second sealing means 23 is the flat portion 23 inside the backshell 21 that engages the O-ring provided by the extensions 31 and 32.

The first cable terminator 20 includes a ferrule seat 24, and a ferrule 25 joined to and extending from the ferrule seat 24. A cylindrical connector stem 26 is joined to the ferrule seat 24, and the connector stem 26 defines an axial channel for receiving one of the fiber optic cables 17 or 18. The ferrule seat 24 defines a bore communicating with the axial channel defined by the connector stem 26. The bore in the ferrule seat 24 receives the ferrule 25 and also the optical fiber contained in the fiber optic cable 17 or 18. Thus, the bore places the ferrule 25 in optical communication with the optical fiber.

The ferrule seat 24 includes an abutment face 27, which is provided with an alignment means 28 that is complementary to the alignment means 37 provided by the center member 30. In the exemplary embodiment discussed above, the alignment means 28 is an alignment pin 28 that engages the aperture 37 defined by the center member 30. As discussed above, this arrangement could readily be reversed within the scope of the invention.

Figure 6:
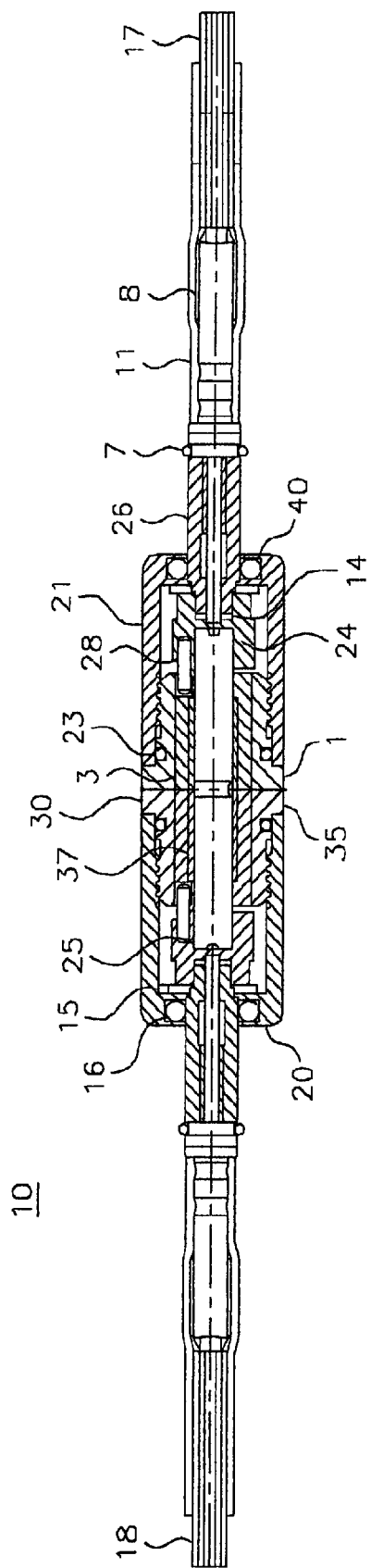
FIG. 6 is a partially cut-away view of the connector as shown in FIG. 1 in assembled form.

The backshell 21 slides along the connector stem 26, and the backshell 21 rotates relative to the connector stem 26 to allow the backshell 21 to engage or thread onto the center member 30. As shown in FIG. 3, the backshell 21 is shown moved to its most fully rearward position relative to the connector stem 26. As shown in FIG. 6, the backshell is shown moved fully forward into engagement with the center member 30.

Figure 5B:
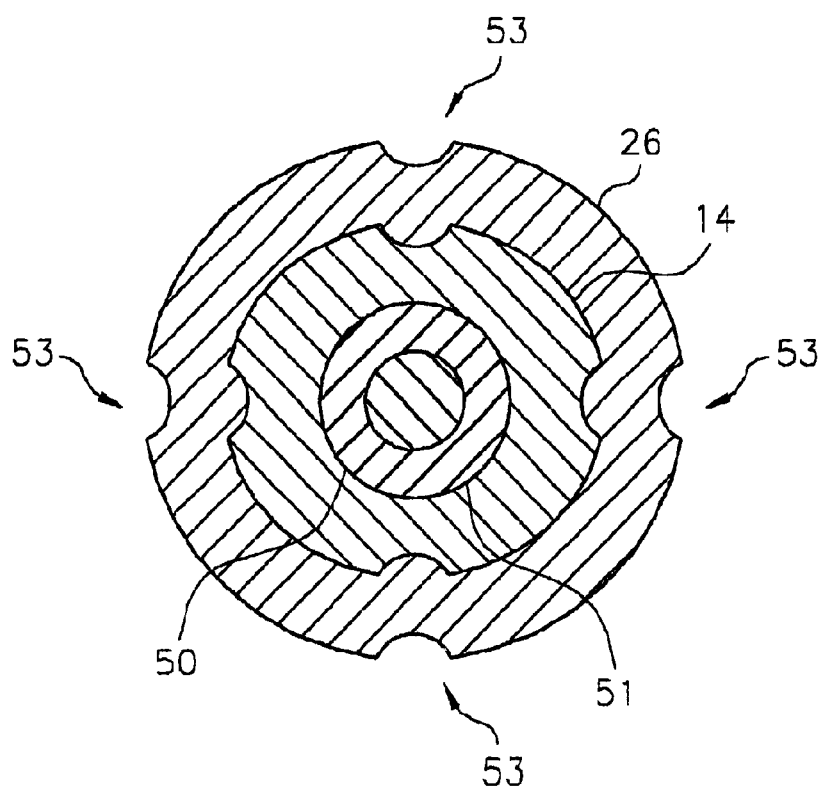

FIGS. 5a and 5b are cross-sectional views of the connector stem 26 of the cable terminator 20, taken along the line 5—5 in FIG. 3. Although FIGS. 3, 5a, and 5b illustrates cable terminator 20, cable terminator 40 contains the same structure. FIGS. 5a and 5b illustrate how connector 10 effects the hermetic seal around the fiber optic cable. FIG. 5a provides a cross-section of the connector stem 26 before crimping, while FIG. 5b illustrates the same cross-section after crimping. In FIG. 5a, the elastomeric sleeve 14 is disposed within the connector stem 26, with a void space 52 shown therebetween. In addition, an cable jacket 50 and a fiber 51 of an optical fiber cable is shown disposed within the elastomeric sleeve 14 with a void space 52 shown therebetween. It is to be understood that the void spaces 52 as shown in FIG. 5a are shown in exemplary, but not limiting, configurations. Further, FIGS. 5a and 5b are not drawn to scale. Thus, all void spaces 52 are not limited to the configurations shown in FIG. 5a.

In FIG. 5b, the connector stem 26 has been crimped with Daniels tool 150 (FIG. 10) to remove all void spaces 52. As discussed in further detail below in FIG. 10, Daniels tool 150 is used to place a plurality of crimps 53 into the connector stem 26. As an alternative to the Daniels tool 150, an IDEAL™ crimping tool or other suitable crimping tool can be used. The Daniels tool 150 uses a selectively replaceable die 151 to determine the depth to which the connector stem 26 is crimped. Different dies 151 crimp to different depths. It is preferable to crimp the connector stem 26 so that the crimps 53 displace all of the void spaces 52 without affecting the structural integrity of the fiber 51. Specifically, the crimps 53 should not be so deep as to drive the cable jacket 50 against the fiber 51, especially so as to sever the fiber 51 or cause microbends in the fiber 51. Depending on the volume of the void spaces 52, as determined by the respective diameters of the connector stem 26, the elastomeric sleeve 14, and the cable jacket 50, the depth of the crimps 53 should be chosen to displace all of the void spaces 52 to effect a hermetic seal around the cable jacket 50 of the optical fiber cable, as shown in FIG. 5b. Clearly, the proper die 151 (FIG. 10) used to effect the crimps 53 will vary for different applications. However, once a proper cable/crimp combination is determined, that combination can be used repeatedly and reproducibly any number of times in the field with a minimum of on-site fine-tuning or adjustment.

FIG. 6 is a partially cut-away view of an exemplary embodiment of the connector 10 as shown in FIG. 1 in assembled form. Cable terminators 20 and 40 are shown assembled onto center member 30.

Center member 30 includes a body 1, which in an exemplary embodiment is machined from stainless steel. The body 1 provides a casing that defines the exterior surface characteristics of the center member 30, including the threaded portions on the extensions 31 and 32, the shoulder 35, and the annular groove that provides a seat for sealing means 23 and 24 (FIG. 3). A suitable sealing means 23 is an O-ring having an inner diameter of 0.260" and a diameter of 0.032", and being formed from neoprene. Suitable O-rings are commercially available from Apple Rubber Products, Inc.

The body 1 also defines an interior axial passage that contains a ferrule shell 3, which in an exemplary embodiment is machined from stainless steel. Ferrule shell 3 is dimensioned according to the diameter of the ferrule 25 used with a given connector 10. Ferule shell 3 also provides the alignment means 28 described above, and defines an axial interior passage for slidably receiving the ferrule 25. As described above, a suitable ferrule alignment means, such as a split-sleeve 37 made from zirconia, is provided in the passage defined by the ferrule shell 3. A suitable split-sleeve 37 is commercially available as part number S25AA114 from Johanson, Inc.

The cable terminators 20 and 40, in the exemplary embodiment shown in FIG. 6, are each engaged to respective extensions of the center member 30. The ferrule 25 is bonded to and extends from the ferrule seat 24. A suitable ferrule 25 may be constructed from zirconia. A suitable ferrule seat 24 can be machined from stainless steel. An alignment means, such as pin 28, extends from the ferrule seat 24, and engages a complementary alignment means, such as an aperture defined by the ferrule seat 24.

A curved washer 15 is provided at the back of the ferrule seat 24, captured as shown between the ferrule seat 24 and the inside bottom of the backshell 21. As an alternative to curved washer 15, a Belleville washer may be used. Suitable curved washers 21 are commercially available from Allied Devices and numerous other vendors. The curved washer 15 restrains the forward travel of the backshell 21 along the connector stem 26. A retaining ring 7 is provided at the back of the connector stem 26 to restrain the rearward travel of the backshell 21. A suitable retaining ring is commercially available from Allied Devices as part number DAZ3. The backshell 21 can be knurled or stippled as necessary to facilitate manipulation by hand.

An additional sealing means, such as O-ring 16, is disposed between backshell 21 and connector stem 26 to prevent environmental contaminants from entering connector 10 by capillary action along connector stem 26. A suitable O-ring 16 is commercially available from Apple Rubber Products, Inc. Exemplary dimensions for O-ring 16 are an inner diameter of 0.150" and a diameter of 0.051", and the O-ring 16 can be formed of neoprene A sleeve 14 of elastomeric material, such as TEFZEL™ sold by DuPont, Inc. of Wilmington, Del., is disposed within the connector stem 26, with the connector stem being crimped onto the sleeve 14 to secure the sleeve 14. TEFZEL™ is listed as an exemplary material suitable for forming the sleeve 14. However, any elastomeric material having low creep and low cold-flow characteristics is suitable for the sleeve 14. Specifically, any elastomeric material is suitable that maintains a crimped position for long periods of time (months or years) without flowing or moving on its own. A crimp sleeve 8 engages the connector stem 26, as described below, to secure the fiber cable 17 or 18. An exemplary process for securing the sleeve 14 within connector 10 is described below. The crimp sleeve 8 and the elastomeric sleeve 14 serve to capture the fiber optic cable within the connector after they are crimped into place. The elastomeric sleeve 14 forms a hermetic seal around the sheath of the fiber optic cable 17 or 18 to prevent liquids, gases, or other environmental contaminants from entering the connector along the fiber optic cable 17 or 18.

After the connector 10 is assembled by crimping the crimp sleeve 8 to the connector stem 26, heat shrink tubing 11 can be applied around the crimp sleeve 8 to provide an additional barrier to environmental contamination. In most applications, the heat shrink tubing 11 is not absolutely necessary; however, it may provide an extra measure of protection that may be desirable in certain applications. A suitable heat shrink tubing 11 is formed from plastic and has an adhesive lining on its inside. Heat shrink tubing 11 provides an additional strain relief member by helping to pass any axial or tensile loads on the fiber optic cables 17 and 18 directly to the connector 10, thereby preventing the fragile optical fiber from bearing such loads. In addition, heat shrink tubing 11, when shrunk onto the fiber optic cables 17 and 18, resists curvature of the fiber optic cables 17 and 18 proximate the connector 10, and prevents the fiber optic cables 17 and 18 from being bent to too tight a radius of curvature. In an exemplary embodiment, heat shrink tubing 11 has thickness and durability characteristics sufficient to meet the parameters set forth above. Suitable heat shrink tubing 11 is readily available from any number of vendors.

In the exemplary embodiment shown in FIG. 1, the second cable terminator 40 is identical to the first cable terminator 20. Accordingly, the above description relating to the first cable terminator 20 applies equally to the second cable terminator 40, and will not be repeated.

Having set forth above the various components of the connector 10, an exemplary method of terminating fiber optic cables 17 and 18 with a connector 10 hermetically sealed to the fiber optic cables 17 and 18 will now be described.

If heat shrink tubing 11 is to be used, place a precut length of such heat shrink tubing 11 over the cable 17 or 18, and slid it up the cable 17 or 18 and out of the way temporarily. Place a crimp sleeve 8 over the fiber optic cable 17 or 18, and also slide it up the cable 17 or 18 and out of the way temporarily. Strip the plastic outer jacket or sheath (about 2.5") of the fiber optic cable 17 or 18 to expose a strength member. The strength member is typically made of KEVLAR™ or similar durable and fibrous material. Strip the strength member away from the cable to expose a plastic inner sheath surrounding an optical fiber disposed within and protected by the plastic inner sheath. Gathering the strength member in one hand, strip the inner sheath to provide a 900 □m buffer to a point 1.0" from the outer cable jacket. Clean any residue from the optical fiber using a wipe soaked in isopropyl alcohol. This concludes the fiber cable preparation and the fiber cable is now ready for insertion into the connector 10.

Provide a connector 10 constructed according to the invention and having a connector stem 26 adapted for receiving the fiber optic cable 17 or 18. Insert the elastomeric sleeve 14 into the connector stem 26. As discussed above, the elastomeric sleeve 14 can be formed from TEFZEL™ or other suitable elastomeric materials. Dry-fit the fiber into the ferrule seat 24 to be sure the ferrule seat 24 will accommodate the fiber, adjusting the fiber as necessary to ensure a proper fit. Trim the strength member (KEVLAR™) to approximately 0.3" above the outer sheath. After the fiber fits correctly within the ferrule seat 24, mix a suitable amount of epoxy according to the instructions provided by the epoxy manufacturer. A suitable epoxy is Tra-Con BA-F113SC. Inject the epoxy into the connector stem 26, preferably using a 20 g. 1.5" long dispensing needle. Insert the needle fully into the bottom of the connector stem 26, and fill the connector stem 26 with epoxy until a small bead appears at the end of the ferrule 25. Do not overfill the connector stem 26, and clean any epoxy residue from the external surfaces of the connector stem 26.

Insert the fiber 51 into the back of the connector stem 26 until the back of the connector stem 26 rests against the outer jacket of the cable 17 or 18. Place the strands of the strength member (KEVLAR™) over the end of the connector stem 26, with the connector stem 26 passing between the strength member and the inner sheath surrounding the optical fiber. Crimp the connector stem 26 onto the elastomeric sleeve 14 using the custom die cavity on the Daniels crimp tool. This first crimping operation secures the elastomeric sleeve 14 within the connector stem 26 by crimping the connector stem 26 onto the elastomeric sleeve 14 and driving the elastomeric sleeve 14 against the inner sheath of the fiber optic cable 17 or 18. As described in further detail below, this first crimping operation forms a hermetic seal between the connector stem 26 and the inner sheath of the fiber optic cable 17 or 18.

After the above first crimping operation, slide the crimp sleeve 8 along the cable 17 or 18 and over the connector stem 26 to capture the strength member (KEVLAR™) material between the connector stem 26 and the crimp sleeve 8. Leave about 0.1" between the top of the crimp sleeve 8 and the shoulder at the end of the connector stem 26 that joins to the ferrule seat 24. Crimp the crimp sleeve 8 using a 0.128" hex cavity on the Daniels crimp tool, thereby securing the fibrous strength member of the cable 17 or 18 between the crimp sleeve 8 and the previously-crimped connector stem 26. This second crimping operation mechanically joins the connector 10, through connector stem 26, to the cable 17 or 18, and prevents any strain applied axially along the cable from pulling the cable 17 or 18 from the connector 10.

Cure the epoxy per manufacturer instructions, and polish the assembled connector 10 as desired or required. If heat shrink tubing 11 is used, slide it along the cable 17 or 18 and over the crimp sleeve 8 to cover the 0.1" gap between the top of the crimp sleeve 8 and the shoulder of the connector stem 26. Exercise caution while heat-shrinking the tubing 11, because the heat required to shrink the tubing 11 may melt the outer jacket of the cable 17 or 18 if the heat is over-concentrated in one area.

In an exemplary embodiment of the method of the invention, void space is left between the connector stem 16 and the elastomeric sleeve 14 before the first crimping operation as described above. The size of the inner diameter of the connector stem 26 relative to the outer diameter of the elastomeric sleeve 14, and size of the outer diameter of the fiber cable 17 or 18 relative to the inner diameter of the elastomeric sleeve 14 is chosen such that when the connector stem 26 is crimped, all of these void spaces are displaced with the elastomeric material 14, thereby effecting the hermetic seal around the fiber optic cable 17 or 18.

The volume of the void spaces and the proportional diameters of the cable 17 or 18, the connector stem 26, and the elastomeric sleeve 14 should be chosen such that the crimps and any resulting deformation of the connector stem displaces a volume of space corresponding to the volume of the void spaces. If the volume of the crimp does not displace the entire volume of the void spaces, then void space will remain around the elastomeric sleeve 14 with the attendant risk that no hermetic seal will be formed. Conversely, if the volume of the crimp does displaces more than the entire volume of the void spaces, then the elastomeric material may be urged too tightly against the fiber cable 17 or 18, with the attendant risk that the optical fiber may be fractured. However, after the dimensions of the cable 17 or 18, the connector stem 26, and the elastomeric sleeve 14 are determined for a given application, a hermetic seal can be repeatedly and reproducibly executed in the field by using the apparatus and method of the invention. Being able to effect a hermetic seal reliably and repeatably is a significant advantage over conventional methods of terminating and connecting fiber optic cables, especially when those conventional methods require manual fine-tuning and adjustment in the field.

Additionally, a crimping tool such as the Daniels tool shown in FIG. 1 is preferable because it applies uniform radial pressure to the fiber optic cable as is crimps the connector stem. The application of uniform and equal pressure is important because unequal pressures applied during crimping may stress the fiber, causing microbends or possibly fractures of the fiber. Microbends decrease the transmissivity of the cable and cause signal losses, and fractures lead to total cable failure.

FIG. 7 is a top plan view of an exemplary embodiment of a feed-through 70 constructed in accordance with the present invention, while FIG. 8 is a cut-away diagram of the feed-through 70 of the invention, taken along the line 8—8 in FIG. 7. As shown in FIGS. 7 and 8, the feed-through 70 hermetically seals onto a fiber optic cable 78. This feed-through 70 finds application especially for passing the fiber optic cable 78 through a wall or other barrier (not shown), while also securing the cable 78 within the feed-through 70 to prevent the cable 78 from moving relative to the feed-through 70. The hermetic seal effected by the feed-through 70 prevents liquids, gasses, or other environmental contaminants from passing through the wall or other barrier along the cable 78, while maintaining the integrity of the cable 78. The feed-through 70 is secured to the wall or barrier by mounting members, such as bolts, screws, or other attachment means, passing through apertures 71.

The feed-through 70 includes a feed-through tube having two cylindrical and coaxial extensions 75 and 76. The extensions 75 and 76 define a channel coaxially with the extensions 75 and 76 for receiving the fiber optic cable 78. An elastomeric sleeve 77 is positioned within the channel and around the fiber optic cable 78. A flange 72 is disposed perpendicularly to the extensions 75 and 76, and defines an annular groove 73. A sealing means, such as an O-ring 74, is disposed within the annular groove 73 to seal the flange 72 against liquid, gasses, or other environmental contaminants. In an exemplary embodiment, O-ring 72 is manufactured from VITON or other similar rubberized material. Suitable material, such as VITON, is commercially available from Beamer Engineering, Inc. The O-ring 72 has an exemplary inside diameter of 0.650" and a diameter of 0.098". A first strain relief boot (not shown) engages the fiber optic cable 78 and engages a first one of the extensions 75 or 76 to hold the cable 78 in place. Likewise, a second strain relief boot (not shown) engages the fiber optic cable 78 and engages a second one of the extensions 75 or 76 as further reinforcement and cable strain relief against any cable movement relative to the feed-through 70.

The feed-through 70 can be machined from a single block of stainless steel stock. Alternatively, the several features of the feed-through 70, including the extensions 75 and 76, and the flange 72 can be machined separately and then welded or otherwise joined together to form the completed feed-through 70. The elastomeric sleeve 77 is formed from material having the same low creep and cold-flow characteristics as described above relating to the elastomeric sleeve 14 shown in FIG. 6. As discussed above, TEFZEL™ as commercially available from DuPont is suitable for use as the elastomeric sleeve 77.

Having described the several components of the feed-through 70, an exemplary method of installing the hermetically sealed feed-through 70 onto a fiber optic cable 78 will now be described. Place a first strain relief boot onto the fiber optic cable 78, and slide it along the cable 78 and out of the way temporarily. Provide a feed-through 70 constructed according to the invention as described above. In an exemplary embodiment, the feed-through 70 has two extensions 75 and 76, with the extensions 75 and 76 defining a channel through both extensions 75 and 76. Insert an elastomeric sleeve 77 having the characteristics described above into the channel. As noted above, TEFZEL™ or other elastomeric materials having low creep and low cold-flow characteristics are suitable for forming the elastomeric sleeve 77. Insert the fiber optic cable 78 into the elastomeric tube 77, and ensure that a sufficient length of cable 78 is extending beyond the feed-through 70.

Crimp the extensions 75 and 76 to engage the elastomeric sleeve 77 against the fiber optic cable 78. In an exemplary method, the extensions 75 and 76 are crimped twice on each of the two extensions 75 and 76. Rotate the feed-through 70 ninety degrees and re-crimp the feed-through 70, again twice on each extension 75 and 76 in an exemplary method. Crimping the extensions 75 and 76 drives the elastomeric sleeve 77 into snug engagement with the fiber optic cable 78. This snug engagement promotes two objectives. First, the cable 78 is restrained from moving relative to the feed-through 70. Second, the multiple crimps provide a hermetic seal and redundant protection against liquids or environmental contaminants entering the feed-through 70. Where the feed-through 70 is used to pass through the wall of an atmosphere chamber, the hermetic feed-through 70 prevents outside contaminants from entering and possibly contaminating the chamber by leakage along the fiber optic cable 78.

After the extensions 75 and 76 are crimped, slide the first strain relief boot down the cable 78 and engage it to a first one of the extensions 75 or 76 and to the fiber optic cable 78. The strain relief boot couples the cable 78 firmly to the feed-through 70, and directs any tensile strain borne by the cable 78 to the feed-through 70. The strain relief boot thus helps to minimize any axial or tensile strain borne by the relatively fragile optical fiber 51. For additional reinforcement, slide a second strain relief boot along the opposite end of the cable 78, that is, the end that was inserted initially through the feed-through 70. Engage the second strain relief boot onto the fiber optic cable 78.

The above discussion pertaining to void spaces as related to crimping the connector 10 (FIG. 5) applies equally to crimping the feed-through 70. Specifically, the diameters of the feed-through extensions 75 and 76, the fiber cable 78, and the elastomeric sleeve 77 are proportioned such that when the extensions 75 and 76 are crimped, all void spaces between those components are displaced with the elastomeric material, thereby effecting the hermetic seal around the fiber optic cable 78. The volume of the void spaces should be chosen such that the crimps and any resulting deformation of the extensions 75 and 76 displace that same volume of space.

FIG. 9 is a cut-away diagram of a connector 90 constructed in accordance with an alternative embodiment of the invention. The connector 90 as shown in FIG. 9 employs a twist-lock engagement rather than the threaded engagement as discussed concerning connector 10. In other respects, the connector 90 is substantially the same as connector 10, with similar reference numerals designating similar structure from connector 10. Specifically, the first cable terminators 91 and 92 are machined from a single piece of stainless steel stock. Alignment means 93 in a first cable terminator 91 or 92 engage complementary alignment means 93 provided by a mating face of the other cable terminator 91 or 92. In the exemplary embodiment shown in FIG. 10, the alignment means 93 include alignment pins extending from a mating face of a first cable terminator 91 or 92, along with corresponding and complementary annular slots defined in a mating face of the other cable terminator 91 or 92. Retaining clips 95 can be provided to hold the alignment means 93 in place. Sealing means 94 are formed from elastomeric material, and seal between cable terminators 91 and 92 to prevent environmental contaminants from entering the connector 90 to damage the ferrules or the other internal components of the connector 90. Alignment means 37 are held in position by a suitable retaining means, which may be an O-ring 96 as illustrated. The O-ring 96 also serves as a secondary hermetic seal. The O-ring 96 may be manufactured from VITON as discussed above. Connector 90 uses the same crimping technique described above in connection with FIG. 5 to effect a hermetic seal around the fiber optic cable.

Figure 10:
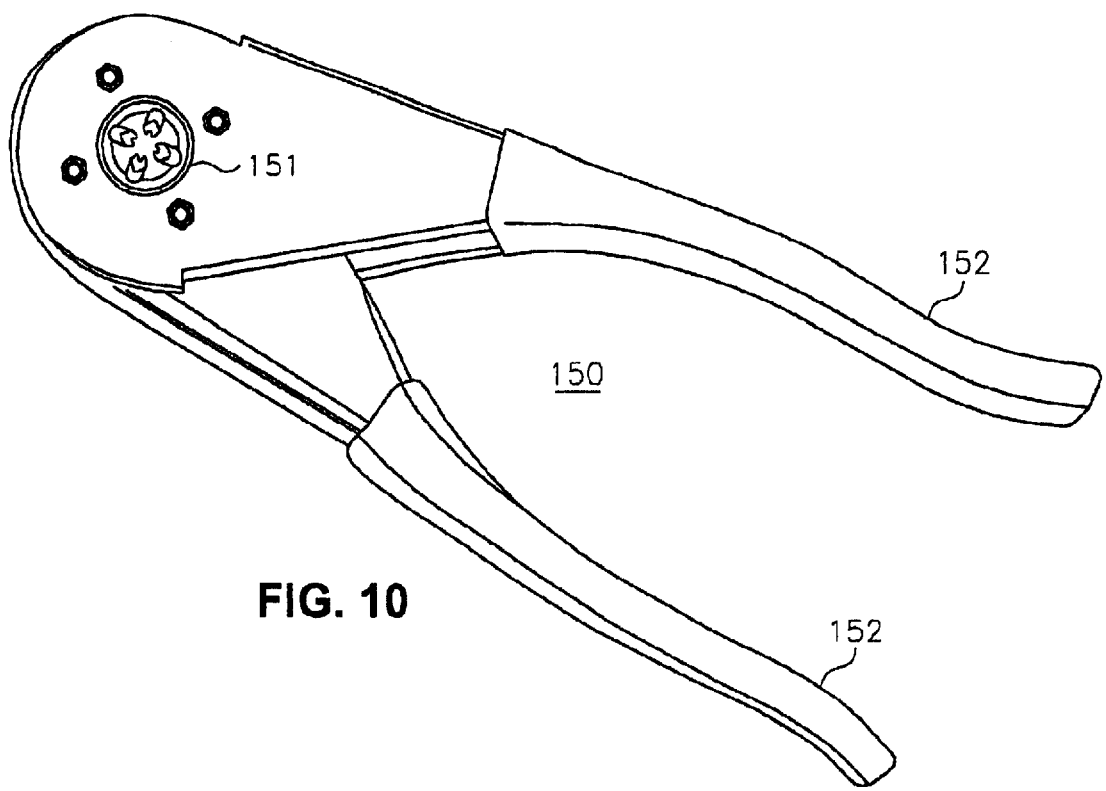
FIG. 10 is a perspective view of a crimping tool suitable for performing the crimping operations described herein.
Figure 11:
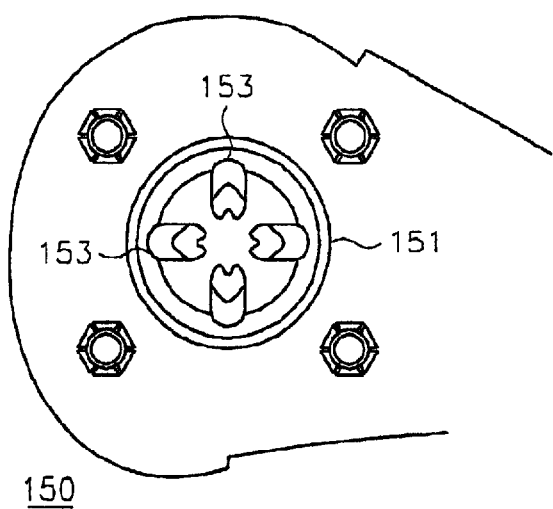
FIG. 11 is a close-up of the die and the crimping members that are provided as part of the crimping tool shown in FIG. 10.
Figure 12:
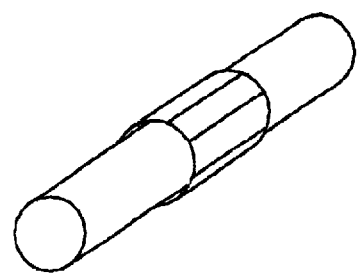
FIG. 12 is a perspective view of a crimp as formed by the crimping tool shown in FIG. 10.

FIGS. 10, 11, and 12 illustrate an exemplary crimping tool 150 used for the crimping operations disclosed above. As shown in FIG. 10, the crimping tool 150 includes two handles 152, and a selectively replaceable die 151. As shown in FIG. 11, the die 151 includes a plurality of crimping members 153, which are disposed radially relative to the die 151. When the handles 152 are urged together, the crimping members 153 are urged uniformly and radially toward the center of the die 151, thereby effecting the crimp as shown in FIG. 12. Different dies 151 can be selected and installed into crimping tool 150 depending on the desired crimp depth, as discussed above. A suitable crimp tool 150 is known in the industry as a Daniels-type crimp tool and is commercially available. Because the crimp tool 150 is an off-the-shelf item, the details of its internal construction and operation are not described herein.

What is claimed:

1. A hermetically sealed connector for joining at least two fiber optic cables, each of said cables including an optical fiber, comprising:

a center member having two extensions, each of said extensions being cylindrical and coaxial, each of said extensions including a first engagement means and a first sealing means, said center member defining a channel axially disposed relative to said extensions;

a first connector including a backshell, said backshell including a second engagement means in complementary relationship with said first engagement means of a first one of said extensions, and a second sealing means in complimentary relationship with said first sealing means of said first one of said extensions, said first connector including a ferrule seat and a ferrule joined to said ferrule seat, said first connector including a cylindrical crimp socket joined to said ferrule seat, said crimp socket defining an axial channel for receiving a first fiber optic cable, said ferrule seat defining a bore placing said ferrule in communication with said axial channel, said bore for receiving said optical fiber of said first fiber optic cable and placing said ferrule in optical communication with said first optical fiber.

2. A method of terminating a fiber optic cable with a connector hermetically sealed to said fiber optic cable, said method comprising the steps of:

placing a crimp sleeve over said fiber optic cable;

stripping an outer jacket from said cable to expose an inner jacket;

stripping an inner jacket from said cable to expose an optical fiber;

providing a connector having a connector sleeve adapted for receiving said fiber optic cable;

inserting a tube into said connector sleeve;

injecting epoxy into said connector sleeve;

crimping said connector sleeve onto said tube;

crimping said crimp sleeve onto said connector sleeve.

3. A feed-through for hermetically sealing onto a fiber optic cable, said feed-through comprising:

a feed-through tube having two cylindrical and coaxial extensions and defining a channel coaxially with said extensions for receiving said fiber optic cable;

a sleeve positioned within said channel and around said fiber optic cable;

an annular flange disposed perpendicularly to said extensions, said flange defining an annular groove; and an O-ring disposed in said annular groove;

a first strain relief boot engaging said fiber optic cable and engaging a first one of said extensions; and a second strain relief boot engaging said fiber optic cable and engaging a second one of said extensions.

4. A method of installing a hermetically sealed feed-through onto a fiber/optic cable, comprising said steps of:

placing a first strain relief boot onto said fiber optic cable;

providing a feed-through having two extensions, said extensions defining a channel therethrough;

inserting a tube into said channel;

inserting said fiber optic cable into said tube;

crimping said extensions to engage said tube against said fiber optic cables; engaging said first strain relief boot to a first one of said extensions and to said fiber optic cable;

placing a second strain relief boot onto said fiber optic cable;

engaging said second strain relief boot to a second one of said extension and to said fiber optic cable.

* * * * *